July 1, 1947.  A. G. FORSYTH  2,423,183
TURBINE TYPE JET PROPULSION
Filed July 13, 1944   6 Sheets-Sheet 5

Fig. 9.

Inventor
ARCHIBALD GRAHAM FORSYTH

Robert B. Larson
Attorney

July 1, 1947. A. G. FORSYTH 2,423,183
TURBINE TYPE JET PROPULSION
Filed July 13, 1944 6 Sheets-Sheet 6

Inventor
ARCHIBALD GRAHAM FORSYTH,
By Robert B. Larson
Attorney

Patented July 1, 1947

2,423,183

UNITED STATES PATENT OFFICE 2,423,183

TURBINE TYPE JET PROPULSION

Archibald Graham Forsyth, Cheam, England, assignor to The Fairey Aviation Company Limited, Hayes, England Application July 13, 1944, Serial No. 544,788

8 Claims. (Cl. 60—35.6)

This invention relates to jet propulsion of craft and more particularly, to a jet propulsion unit for aircraft and the like. This application is a continuation-in-part of my application Serial No. 515,013, filed December 20, 1943.

Various types of power means for aircraft employing the jet propulsion principle have been proposed heretofore. The present invention relates to that type which employs a compressor adapted to discharge air under pressure and increased temperature into a combustion chamber, the exploding charge from which is expanded through a turbine and thence through discharge jets against the atmosphere rearwardly of the aircraft to propel the aircraft in a forward direction. Devices of this general type heretofore proposed have usually been constructed with the compressor and turbine in tandem which gives rise to considerable disadvantages which the present invention obviates.

The present invention has for a principal object the provision of a self-contained jet propulsion unit in which the compressor and turbine are coaxially arranged in a single uniflow structure in such a manner that the adjacent blades of the compressor are adapted to be rotated in opposite directions, thus providing greatly increased efficiency at higher altitudes.

Another object of the invention is to provide a jet propulsion unit having a variable pitch propeller adapted to be coupled selectively to be driven by the unit for use during take-off, climb and also during cruising at lower altitudes, the arrangement being such that upon reaching high altitudes, the propeller may be feathered and declutched so as to offer minimum head resistance, the propulsion jets then providing the sole propelling effect.

As a corollary, the invention provides an arrangement in which, when the aircraft again descends to a lower altitude, the propeller can again be clutched to be driven with the turbine.

In accordance with a modification of the invention, a self-contained jet propulsion unit is provided in which certain of the compressor blades can be made stators, as, for example, during take-off and while traveling at comparatively low altitudes, the arrangement being such that these stators at higher altitudes can be made to rotate in a direction contrary to the other blades whereby increased efficiency at higher altitudes is effected. It is a further object of the invention to provide such an arrangement.

The invention has for a further object the provision of a unit which will be interchangeable with existing power plants, thus enabling certain types of aircraft to be changed over to jet propulsion quickly, without modifying the aircraft.

Still a further object of the invention resides in the arrangement and disposition of the various parts of the unit giving rise to such power plants of shortest possible length and smallest possible diameter, thus permitting a housing which will offer minimum head resistance. Moreover, the power unit only has a single casing, thus greatly reducing the weight.

These and other objects of the invention will become more apparent from the following description and claims when read in conjunction with the accompanying drawings in which:

Fig. 1a is a similar view of the rear end of the same embodiment;

Figure 1:
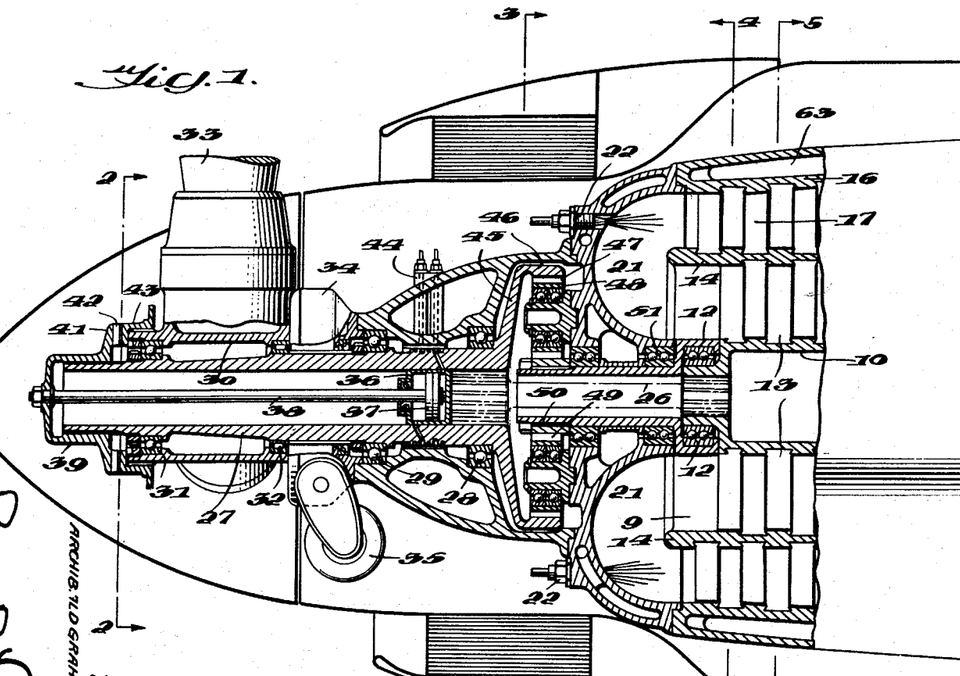
Fig. 1 is a longitudinal horizontal section taken through the front end of one embodiment of the invention.

With reference to Figs. 1 and 1a the power unit includes a central longitudinal hollow shaft 10 mounted for rotation about its longitudinal axis. The shaft 10 is supported for rotation by the bearings 11 and 12. Secured to the shaft 10 to rotate therewith are a series of evenly spaced compressor blades 13 which extend radially outwards from the shaft to a cylindrical tubular member 14.

Disposed concentrically with respect to the cylindrical tubular member 14 and the shaft 10 is the outer part of the casing 16, which outer part is frusto-conical in form with its larger diameter toward the rear end of the unit (the right end in Fig. 1a).

The inner surface of the cylindrical tubular member 14 is provided with evenly spaced compressor blades 15. These are disposed alternately with the blades 13 on the shaft 10.

The outer surface of the cylindrical tubular member 14 is provided with evenly spaced turbine blades 17 rigidly secured thereto. These blades 17 extend radially outward toward the inner wall of the casing 16 and it will be noted that they progressively increase in length, the blades at the rear end being somewhat longer than those at the front.

The inner wall of the casing 16 is also provided with turbine blades 18 rigid therewith and which blades are evenly spaced and are disposed alternately with respect to the blades 17 on the cylindrical tubular member 14. The length of the blades 18 also increases progressively from front to rear of the device.

In accordance with the invention the shaft 10 is adapted to be driven in a direction contra to the direction in which the cylindrical tubular member 14 is to be rotated.

The blades 13 on the shaft 10 and the blades 15 on the inner wall of the cylindrical tubular member 14 form a multi-stage compressor. This compressor is supplied with air from the atmosphere which enters through the inlet 19 and then to the rear end of the compressor as indicated by the arrows. A butterfly valve 20 or the like, activated by the pilot, is adapted to control the amount of air entering the compressor.

Air compressed in the compressor is expelled toward the front into the combustion chamber 21 which has smoothly curved walls. Fuel jets 22 are adapted to impart a fuel mixture into the combustion chamber, thus effecting explosion.

The space between the outer wall of the cylindrical tubular member 14 and the casing 16 and the blades disposed therein comprise a turbine. Exhaust gases from the combustion chamber 21 are directed through this turbine toward the rear and finally enter passages 23 which terminate in propulsion jets 24 which direct the expanded gases against the atmosphere rearwardly of the craft, thus providing a propelling force for the craft.

The propulsion unit may be started by a small electric motor (not shown) connected by a "Bendix" starter drive to the shaft 10. Such a starting arrangement may be located to the rear of the casing within the rear end of the cowling 25. Also to aid in starting, the combustion chamber 21 may be provided with a spark plug or the like (not shown).

In accordance with this embodiment of the invention, the front end of shaft 10 has a forwardly extending shaft 26 splined thereto, the forward end of this shaft 26 in turn being splined to a hollow shaft 27 disposed for rotation within the casing 16 by the bearings 28 and 29.

Disposed on the hollow shaft 27 for free rotation thereabout is a propeller hub 30. Bearings 31 and 32 are provided for this purpose. The propeller hub 30 supports a plurality of propeller blades, such as 33, the pitch of which may be varied by pitch changing means 34 driven by a small electric motor 35. The details of the pitch changing mechanism form no part of the instant invention, but they may, for example, be of the type illustrated in several of my co-pending applications such as Serial No. 472,882, filed January 19, 1943.

Figures 2, 3, 4:
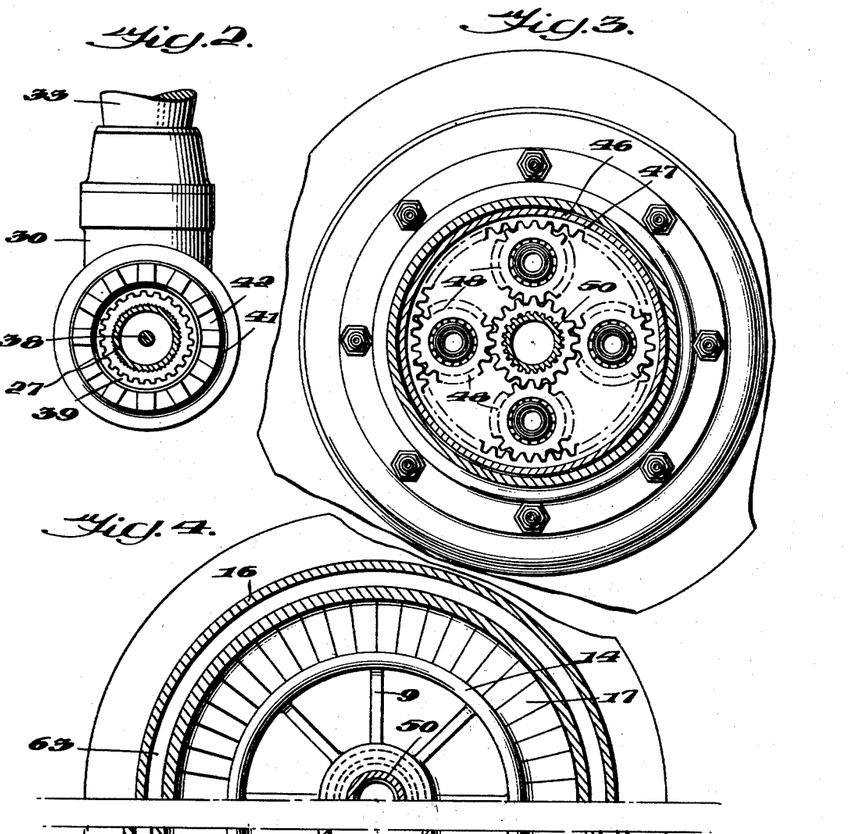
Fig. 2 is a section taken on the line 2—2 of Fig. 1.
Fig. 3 is a section taken on the line 3—3 of Fig. 1.
Fig. 4 is a half section taken on the line 4—4 of Fig. 1.

Secured within the hollow shaft 27 is a cylinder 36 provided with a piston 37 connecting with a rod 38 extending through the front wall of the cylinder 36 and forwardly to the front end of the hollow shaft 27. The rod 38 is secured to the member 39 which is in the form of a cap splined to the hollow shaft 27 as at 40. As also shown in Fig. 2, the cap 39 is provided with an annular flange 41 formed with gear teeth 42 adapted to engage teeth on a ring member 43 rigid with the propeller hub 30.

The cylinder 36 in the hollow shaft 27 is connected by passageways with a hydraulic system generally indicated by the reference numeral 44 and adapted to supply fluid under pressure to the cylinder 36 on either side of the piston 37 to move it selectively, either to the right or the left. If the piston 37 is moved to the left, the cap member 39 will also be moved to the left so that the teeth on its flange 41 will disengage the teeth on the ring member 43. The propeller hub 30 will then be free from any rotary movement imparted to the hollow shaft 27. When, however, the piston 37 is moved to the right, the teeth will engage and the propeller hub 30 must partake in any rotation imparted to the hollow shaft 27.

The inner end of the hollow shaft 27 is provided with an outwardly extending flange 45 terminating in an annular ring gear 46 having teeth 47 on its inner periphery. The casing 16 supports a plurality of freely rotatable pinion gears 48 (see also Fig. 3) adapted to engage the ring gear 46 and also gear teeth 49 on a sleeve member 50 supported for rotation in casing 16 by the bearings 51 and with respect to the shaft 10 by the bearings 12. The sleeve 50 is rigidly connected by suitable means with the cylindrical tubular member 14 or may be made integral therewith.

It will be noted that the mechanism described includes an epicyclic gear system, which when the cylindrical tubular member 14 is rotated, imparts rotation to the hollow shaft 27 and thence through the pinion gears 48 to the shaft 10, thus causing the cylindrical tubular member 14 to rotate in a direction opposite to that of the shaft 10. Thus, in the compression portion of the unit, the blades will be revolved in contrarotation.

Figure 6:
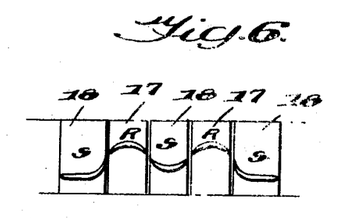
Figs. 6 and 7 are diagrammatic representations respectively of the turbine and compressor blades.
Figure 7:
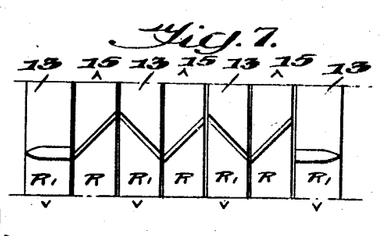
Figure 7A:
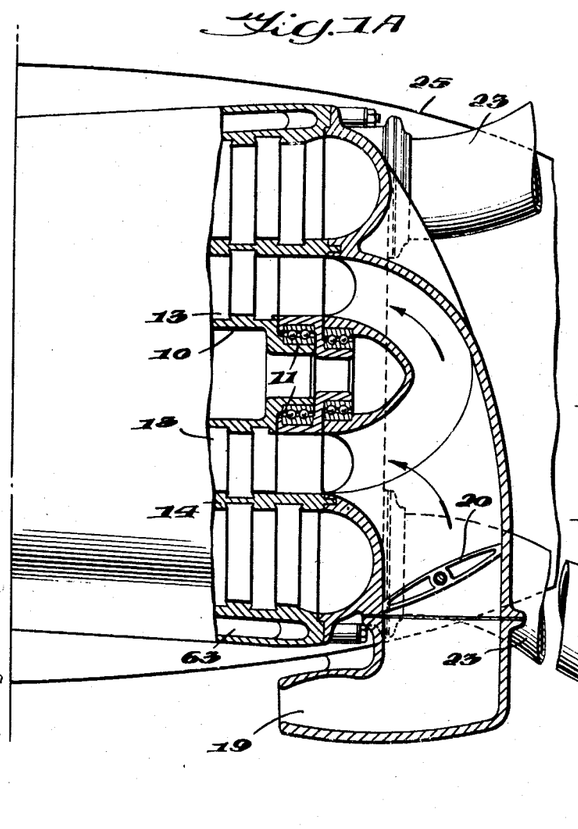

Figs. 6 and 7 show diagrammatically the turbine and compressor blades, respectively. In Fig. 6 the letter S indicates the static blades while those lettered R indicate those which rotate. In Fig. 7 both sets of blades rotate and in opposite directions, those indicated by the letter R rotating in one direction while those bearing the letter R1 rotating in the opposite direction.

Figure 5:
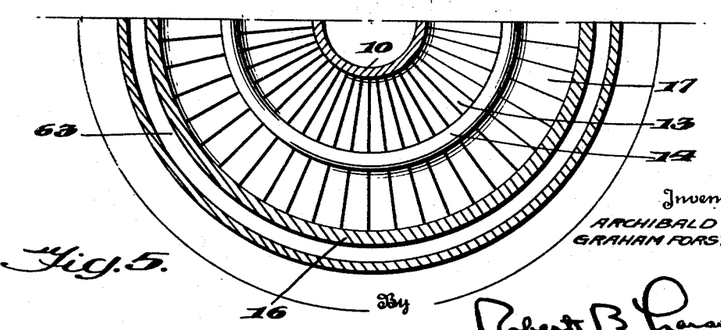
Fig. 5 is a half section taken on the line 5—5 of Fig. 1.

The concentric disposition of the turbine and compressor blades is shown in Fig. 5. In Fig. 4 the cylindrical tubular member 14 is shown as supported at its front end by the sleeve 50 to which it is joined by spiders 9.

The operation of the unit is as follows:

Assuming that the aircraft is on the ground, the unit as stated is first started by rotating the shaft 10 a few turns by an electric motor or the like. Air drawn in from the inlet 19 passes the butterfly valve 20 to the compressor portion of the device in the direction of the arrows. The blades 13 and 15 rotating in opposite directions, as described, provide multi-stage compression of the air and consequent increase in temperature so that when the compressor discharges the air into the combustion chamber 21, fuel is injected by fuel jet nozzles 22 and explosion takes place.

The exploding gases are directed toward the turbine, the blades 17 and 18 of which (the latter being stators), together with the shape of the turbine portion, cause rapid expansion of the exhaust gases. These gases pass in the direction of the arrows to the conduits 23 and are finally directed rearwardly against the atmosphere through the propulsion jets 24.

During this starting, the piston 37 is to the left so that the propeller hub 30 is not coupled to rotate with the hollow shaft 27.

When the unit is warmed up and ready for take-off, the pitch changing mechanism 34 is actuated to place the propeller blades in fine pitch position. The piston 37 is then moved to the right, thus coupling the hollow shaft 27 with the propeller hub 30. The propeller thus also rotates. Particular attention should be given to the gearing arrangement. It will be noted that the turbine drives the propeller shaft through a planetary gearing system, thus giving the reduction required for propeller efficiency at "take-off."

The propeller is employed during take-off, climb and also during cruising at low altitude. As the aircraft reaches higher altitude, the effectiveness of the propeller gradually decreases and eventually a point is reached where the propeller, regardless of adjustment of the pitch of the blades, offers no assistance to the propelling of the aircraft. So that it will not then offer head resistance, the propeller blades are moved to feathering position and the piston 37 is moved to the left, thus uncoupling the propeller hub 30 from the rotating hollow shaft 27. In actual operation, this will be effected sometime prior to reaching the altitude at which the propeller offers no assistance.

When the aircraft descends to low altitude, the pitch of the propeller blades can be adjusted to rotate the propeller hub 30 at a speed similar to that of the hollow shaft 27 and then the piston 37 can be moved to the right thus again coupling the propeller hub 30 to the hollow shaft 27.

Figure 8:
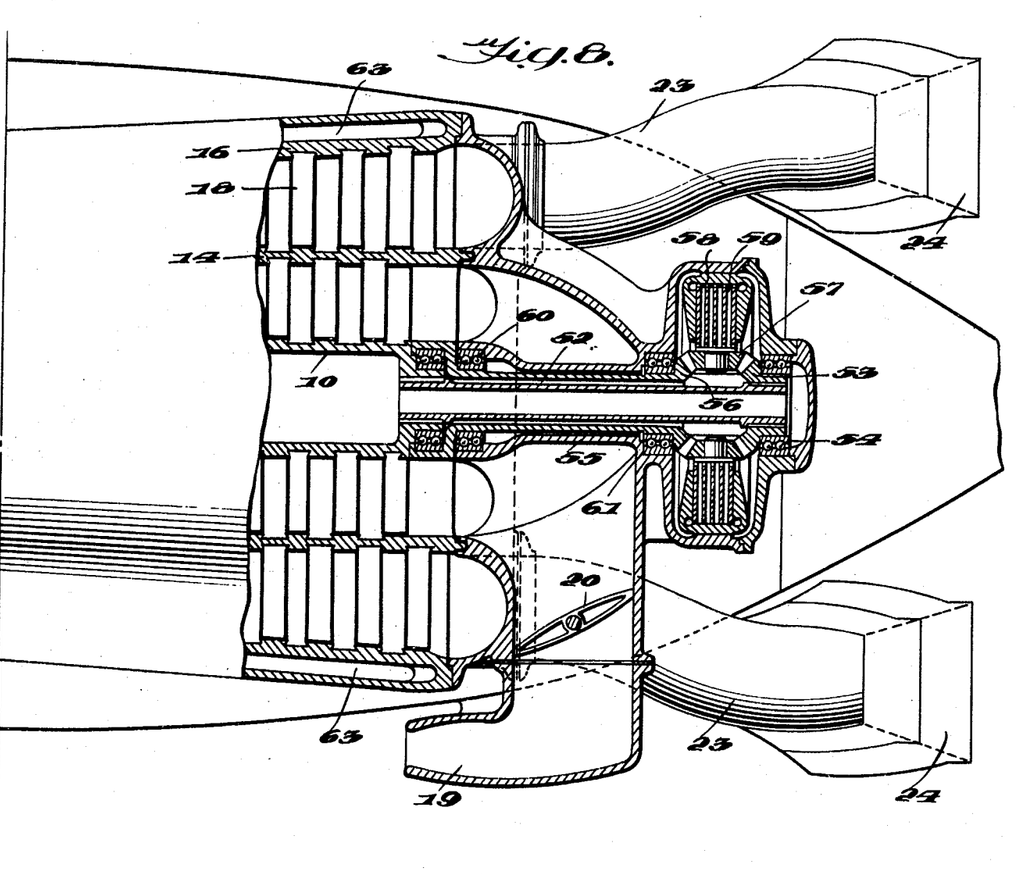
Fig. 8 is a longitudinal horizontal section taken through the rear end of another embodiment of the invention, the front end being identical with Fig. 1.

A second embodiment of the invention illustrated by Fig. 1 and Fig. 8 taken together, is generally similar to the first embodiment and like parts have been indicated by the same reference numerals. The forward part of this modification is the same as that shown in Fig. 1 except that it omits the shaft 26 (which for that reason is shown in dotted lines) in Fig. 1 as splined both to the shaft 10 and the hollow shaft 27.

At the rear end of the unit (Fig. 8) there is a shaft 52 splined to the shaft 10 at its forward end. This shaft 52 extends rearwardly and at its rear end is splined to the bevel gear 53 mounted by bearings 54 for rotation in the casing 16.

Surrounding shaft 52 is the sleeve 55, the forward end of which is rigid with the cylindrical tubular member 14. The rear end of the sleeve 55 terminates in a bevel gear 56. The sleeve 55 is supported in the casing by bearings 60 and 61.

The bevel gears 53 and 56 are adapted to be operatively connected by the bevel gears 57. Bevel gears 57 are permitted to rotate or to remain stationary by a clutching arrangement (known per se) which includes the discs 58 and 59. By hydraulic means (not shown) the discs 58 and 59 may frictionally engage thus preventing bevel gears 57 from rotating about their spindles. Rotation of gear 53 will then effect rotation of gear 56.

It will be noted that when this clutch arrangement is declutched the shaft 10 carrying half of the compressor blades 13 will not rotate, but that when it is clutched, the shaft 10 will rotate with the cylindrical tubular member 14 as the unit operates.

The purpose of such a modification is as follows: When the aircraft is on the ground or is flying at low altitudes, the unit will draw in air which is high density air. To develop sufficient compression for efficient operation with such air, it is not necessary to employ contrarotating blades in the compressor shown. Consequently, the clutching arrangement at the rear is declutched, disconnecting the drive connection from the cylindrical tubular member 14 to the shaft 10. The shaft 10 and the compressor blades 13 secured thereto do not rotate. The compressor will thus only deliver about one-half of the volume as during contrarotation of the compressor blades. The power to drive the compressor is reduced and the propulsion power effected at ground level is thus greater than should contrarotation be used.

However, as the aircraft rises to high altitudes, the air drawn in is of low density. The clutch arrangement at the rear end is then clutched so that the bevel gear drive connection between the cylindrical tubular member 14 and the shaft 10 will be established, resulting in rotation of the shaft 10 and contrarotation of the blades 13 and 15 of the compressor. Contrarotation thus makes up for the power drop which would otherwise occur at higher altitudes.

With reference to Fig. 7, the selective contrarotation of the compressor blades may be expressed by stating that the blades bearing the letter $R_1$ may either be caused to rotate in a direction opposite to those of $R$, or the blades $R_1$ may, by declutching the clutch, be caused to remain stationary or at least relatively static.

Various modifications of the two embodiments illustrated come within the purview of the invention. So as to keep the turbine as cool as possible, water or steam may be injected into the combustion chamber intermediate the injection fuel nozzles. Such steam, for example, may be taken from the cooling water jacket 63 formed in the casing 16 surrounding the turbine.

Figs. 9, 10, 11 and 12 illustrate a modified form similar to the embodiment just described except in the structure comprising the combustion chamber. Like parts are indicated by like reference numerals.

Figure 9:
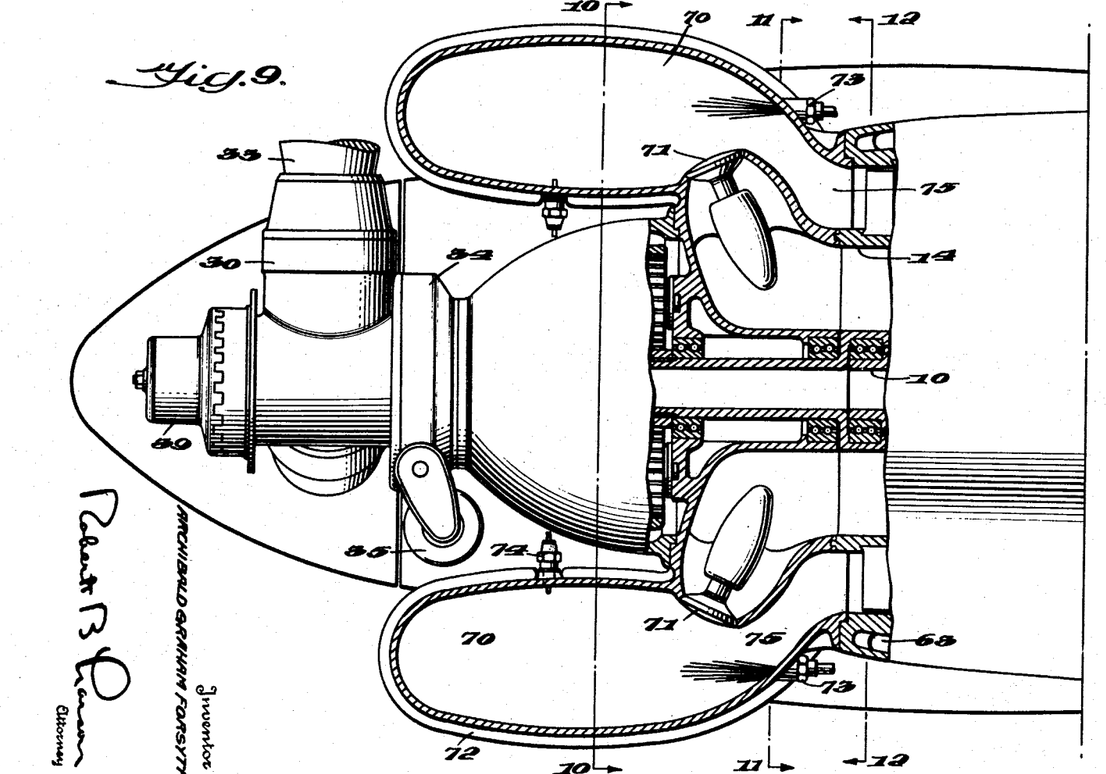
Fig. 9 is a longitudinal horizontal section taken through the front end of still another embodiment.

The compressor in this instance delivers the compressed air into a series of combustion chambers 70. The air inlets to the combustion chambers 70 are controlled by valves such as 71. These may be of the same type as those described in my copending application Serial No. 515,013, filed December 20, 1943.

The combustion chambers 70 are formed with exterior cooling fins 72. Fuel is injected by means of the nozzles 73. For starting, sparking plugs such as 74 may be employed.

The combustion chambers 70 are connected with a Venturi shaped passageway 75 to the turbine space of the device and the exploding gases pass through the turbine and finally to the jets.

Figure 10:
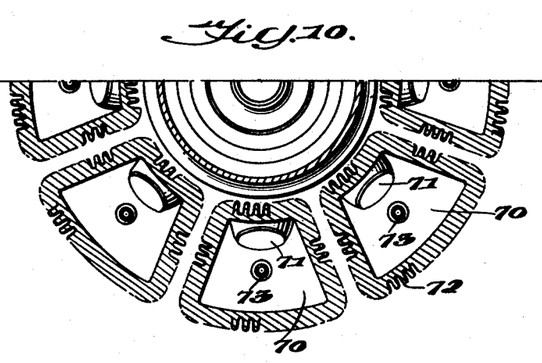
Fig. 10 is a half section taken on the line 10—10 of Fig. 9.
Figure 11:
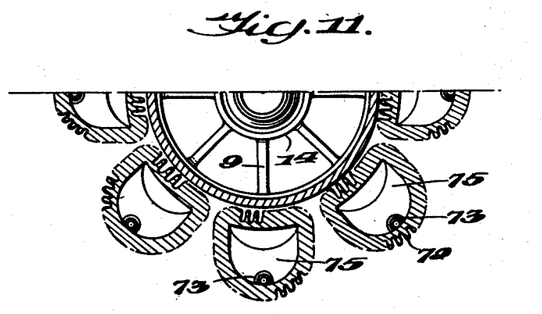
Fig. 11 is a half section taken on the line 11—11 of Fig. 9.
Figure 12:
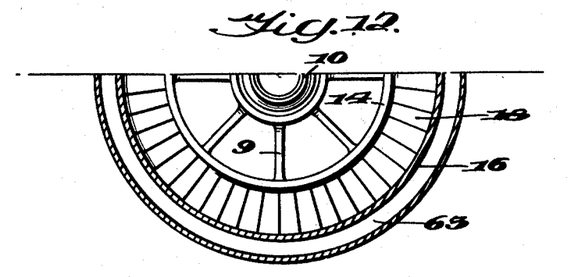
Fig. 12 is a half section taken on the line 12—12 of Fig. 9.

Figs. 10, 11 and 12 are vertical sections taken on various lines of Fig. 9 and show, more or less diagrammatically the shape of the combustion chambers and the disposition of the valves, fuel nozzles and other elements of this embodiment.

It is obvious that one or any number of units according to the invention may be employed for driving an aircraft. Moreover, one or more of such units may be employed to supplement the standard internal combustion engine driven propellers.

It should be manifest that various changes in structure and arrangement of the parts can be made without departing from the invention which is only to be limited as indicated in the following claims.

What I claim is:

1. A jet propulsion unit for aircraft and the like comprising a rotatable shaft, a rotatable tubular member and a frusto-conical casing portion, coaxially and concentrically disposed with respect to each other and disposed in outwardly spaced surrounding positions in the order named, a series of compressor blades in the compressor space between the shaft and the tubular member, said blades being alternately secured to the shaft and to the inner surface of the tubular member, a series of turbine blades in the turbine space between the tubular member and the casing portion, said last named blades being alternately secured to the outer surface of the tubular member and to said casing portion, means for introducing air to the rear end of the compressor space, a combustion chamber connecting the front ends of the compressor and turbine spaces, an exit passage extending rearwardly from the turbine space and terminating in propulsion jets for directing exhaust gases rearwardly into the atmosphere, and gear means connecting the tubular member and the shaft to rotate the shaft in a direction opposite to that of the tubular member when the latter is rotated.

2. In a jet propulsion arrangement for aircraft and the like and having a turbine, propulsion jets adapted to be furnished with combustion products from said turbine, a compressor driven by the turbine, a propeller hub carrying propeller blades and freely rotatable on a propeller shaft, and means for selectively operatively connecting the propeller hub to be driven by said turbine; that improvement which comprises a rotatable shaft, a rotatable cylindrical member and a conical casing portion, coaxially and concentrically disposed with respect to each other and disposed in outwardly spaced surrounding positions in the order named, a series of compressor blades in the compressor space between the shaft and the tubular member, said blades being alternately secured to the shaft and to the inner surface of the tubular member, a series of turbine blades in the turbine space between the tubular member and the casing portion, said last named blades being alternately secured to the outer surface of the tubular member and to said casing portion, means for introducing air to the rear end of the compressor space, a combustion chamber connecting the front ends of the compressor and turbine spaces, an exit passage extending rearwardly from the turbine space and terminating in said propulsion jets for directing combusion products rearwardly into the atmosphere, and means connecting the tubular member and the rotatable shaft to rotate said shaft in a direction opposite to that of the tubular member when the latter is rotated, said propeller shaft being rotatable with said rotatable shaft.

3. A jet propulsion unit for aircraft and the like comprising a rotatable shaft, a rotatable tubular member and a frusto-conical casing portion coaxially and concentrically disposed with respect to each other and disposed in outwardly spaced surrounding positions in the order named, a series of compressor blades in the compressor space between the shaft and the tubular member, said blades being alternately secured to the shaft and to the inner surface of the tubular member, a series of turbine blades in the turbine space between the tubular member and the casing portion, said last named blades being alternately secured to the outer surface of the tubular member and to said casing portion, means for introducing air to the rear end of the compressor space, a combustion chamber connecting the front ends of the compressor and turbine spaces, an exit passage extending rearwardly from the turbine space and terminating in propulsion jets for directing exhaust gases rearwardly into the atmosphere, gear means connecting the tubular member and the shaft to rotate the shaft in a direction opposite to that of the tubular member when the latter is rotated, and means for selectively uncoupling said gear means whereby said shaft will not be driven by said tubular member.

4. A jet propulsion unit for aircraft and the like comprising a rotatable shaft, a rotatable tubular member and a frusto-conical casing portion, coaxially and concentrically disposed with respect to each other and disposed in outwardly spaced surrounding positions in the order named, a series of compressor blades in the compressor space between the shaft and the tubular member, said blades being alternately secured to the shaft and to the inner surface of the tubular member, a series of turbine blades in the turbine space between the tubular member and the casing portion, said last named blades being alternately secured to the outer surface of the tubular member and to said casing portion, means for introducing air to the rear end of the compressor space, a combustion chamber connecting the front ends of the compressor and turbine spaces, an exit passage extending rearwardly from the turbine space and terminating in propulsion jets for directing exhaust gases rearwardly into the atmosphere, and gear means connecting the tubular member and the shaft to rotate the shaft in a direction opposite to that of the tubular member when the latter is rotated, said gear means including a sleeve secured to said tubular member and surrounding an extension on said shaft, said sleeve having gear teeth thereon, a ring gear of larger diameter than the sleeve and coaxially surrounding the same, said ring gear having teeth on its inner periphery, a series of freely rotatable pinion gears disposed to engage the teeth on the sleeve and on the ring gear, and means connecting the ring gear and the shaft extension.

5. A jet propulsion unit for aircraft and the like comprising a rotatable shaft having a series of compressor blades secured thereto and extending radially outwardly therefrom, said blades being spaced along the shaft, a rotatable cylindrical tubular member coaxially surrounding said shaft and spaced therefrom, said tubular member having compressor blades secured to and extending inwardly from its inner surface, said blades being evenly spaced along said tubular member and being disposed alternately with respect to the compressor blades secured to said shaft, a series of evenly spaced turbine blades secured to the outer surface of said tubular member and extending radially outwardly therefrom, a casing having a frusto-conical portion disposed to surround said tubular member and spaced therefrom, said portion being coaxial with respect to said tubular member and said shaft, said portion having fixed evenly spaced turbine stator blades extending radially inwards, said stator blades being disposed alternately with respect to the turbine blades secured to the outer surface of said tubular member, means for introducing air into the rear end of the compression space between the shaft and the tubular member, a combustion chamber at the front end connecting the compression space and the turbine space between the tubular member and the casing portion, fuel jet means in said combustion chamber, passages extending from the outlet of said turbine space, said passages terminating in propulsion jets directed rearwardly of the aircraft, and gear means connecting the tubular member and the shaft to rotate the shaft in a direction opposite to the tubular member when the latter is rotated.

6. A turbine unit comprising a rotatable shaft, a rotatable tubular member, and a casing coaxially and concentrically mounted with respect to each other in the order named, a series of compressor blades in the compressor space between the shaft and the tubular member, said blades being alternately secured to the shaft and the inner surface of the tubular member, a series of turbine blades in the turbine space between the tubular member and the casing, said turbine blades being alternately secured to the outer surface of the tubular member and the inner surface of said casing, said compressor having an air inlet at one end, a combustion chamber connecting the other end of the compressor with the inlet of said turbine, and means connecting the tubular member and the shaft to drive the shaft in a direction opposite to that of the tubular member when the latter is rotated.

7. A turbine unit comprising a shaft, a rotatable tubular member, and a casing coaxially and concentrically mounted with respect to each other in the order named, a series of compressor blades in the compressor space between the shaft and the tubular member, said blades being alternately secured to the shaft and the inner surface of the tubular member, a series of turbine blades in the turbine space between the tubular member and the casing, said turbine blades being alternately secured to the outer surface of the tubular member and the inner surface of said casing, said compressor having an air inlet at one end, and a combustion chamber connecting the other end of the compressor with the inlet of said turbine.

8. A turbine unit comprising, a rotatable shaft, a rotatable tubular member, and a casing coaxially and concentrically mounted with respect to each other in the order named, a series of compressor blades in the compressor space between the shaft and the tubular member, said blades being alternately secured to the shaft and the inner surface of the tubular member, a series of turbine blades in the turbine space between the tubular member and the casing, said turbine blades being alternately secured to the outer surface of the tubular member and the inner surface of said casing, said compressor having an air inlet at one end, a combustion chamber connecting the other end of the compressor with the inlet of said turbine, means connecting the tubular member and the shaft to drive the shaft in a direction opposite to that of the tubular member when the latter is rotated, and means for selectively uncoupling the connecting means between said tubular member and said shaft, whereby the shaft will not be driven by said tubular member.

ARCHIBALD GRAHAM FORSYTH.

REFERENCES CITED

The following references are of record in the file of this patent:

UNITED STATES PATENTS

| Number | Name | Date |
| --- | --- | --- |
| 1,726,104 | Harris | Aug. 27, 1929 |
| 1,759,817 | Roder | May 20, 1930 |
| 2,391,779 | Griffith | Dec. 25, 1945 |

FOREIGN PATENTS

| Number | Country | Date |
| --- | --- | --- |
| 495,469 | Great Britain | Feb. 8, 1937 |
| 548,898 | Great Britain | Oct. 28, 1942 |
| 380,068 | France | Sept. 27, 1907 |
| 51,150 | Austria | Dec. 11, 1911 |